United States Patent [19]
Petersen et al.

[11] 3,891,608
[45] June 24, 1975

[54] RUBBER MIXTURES SHOWING IMPROVED SURFACE TACK

[75] Inventors: Harro Petersen, Frankenthal; Paulus Erhard, Weinheim; Hubertus Queins, Friedelsheim; Hubert Schoeppl, Mannheim, all of Germany

[73] Assignee: BASF Aktiengesellschaft, Ludwigshafen, Rhine, Germany

[22] Filed: July 5, 1974

[21] Appl. No.: 485,805

[30] Foreign Application Priority Data
July 10, 1973 Germany............................ 2334915

[52] U.S. Cl. ........... 260/80.78; 260/30.2; 260/83.3; 260/85.1; 260/85.3; 260/94.7 N; 260/94.7 A; 260/726; 260/739
[51] Int. Cl............................ C08c 1/40; C08d 1/00
[58] Field of Search......... 260/94.7 N, 94.7 A, 85.1, 260/30.2, 80.78, 83.3, 726, 739, 85.3

[56] References Cited
UNITED STATES PATENTS
2,804,448   8/1957   Hallenbeck...................... 260/85.3

Primary Examiner—William F. Hamrock
Attorney, Agent, or Firm—Johnston, Keil, Thompson & Shurtleff

[57] ABSTRACT

Rubber mixtures containing a 2-oxohexahydropyrimidine of the general formula:

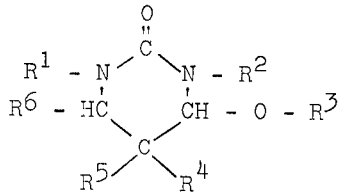

wherein the radicals $R^1$ to $R^6$ are the same or different and each individually denotes hydrogen or alkyl of from 1 to 20 carbon atoms. Such rubber mixtures possess excellent and persistent surface tack.

1 Claim, No Drawings

RUBBER MIXTURES SHOWING IMPROVED SURFACE TACK

This application discloses and claims subject matter described in German Pat. Application No. P 23 34 915.7, filed July 10, 1973, which is incorporated herein by reference.

This invention relates to rubber mixtures containing a tackifier based on an oxohexahydropyrimidine.

Non-vulcanized rubber articles such as sheets or strips must possess surface tack if they are to be made up into compound or shaped articles. Such surface tack is the only means by which the rubber can be shaped prior to vulcanization. It also avoids the occurrence of trapped air and thus provides good adhesion of the separate layers of rubber during subsequent vulcanization. The rubber should remain tacky throughout the entire storage period normally required until it is processed.

Tackiness is usually improved by the addition of tackifiers to the rubber. Tackifiers include rosin, coumarone resin, resins based on hydrocarbons, phenol/-formaldehyde resins and polyadducts of phenols and acetylene. The surface tack achieved using these additives is frequently insufficient however, and above all, it diminishes rapidly when the rubber is stored for a number of days.

It has now been found that 2-oxohexahydropyrimidines have an excellent and persistent tackifying effect on rubber mixtures. These compounds have the general formula

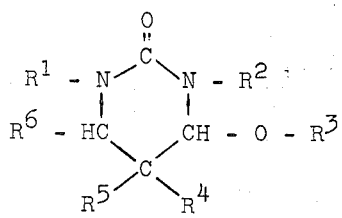
I in which the radicals $R^1$ to $R^6$ may be the same or different and each individually denotes hydrogen or alkyl of from 1 to 20 and preferably of from 1 to 8 and more preferably of from 1 to 3 carbon atoms, which may optionally be substituted by further functional groups such as Cl, OH and CHO.

These oxohexahydropyrimidines may be manufactured by cyclocondensation of urea or its monosubstituted or symmetrically disubstituted derivatives with 2 moles of an aldehyde of which at least one mole must have a CH-acid character or with $\alpha$, $\beta$-unsaturated aldehydes in the presence of acids and in the presence or absence of an alcohol $R^3OH$, in which $R^3$ has the meanings given above. Such processes are described, for example, in German Pat. Nos. 1,230,805 and 1,231,247.

Suitable rubbers are all conventional natural and synthetic rubbers, for example homopolymers of butadiene or isoprene or their copolymers with styrene or acrylonitrile, butyl rubber and ethyl/propylene rubbers. The oxohexahydropyrimidines should be present in the rubber mixture in amounts of from 1 to 20 and preferably from 2 to 10 parts, for every 100 parts of rubber. The mixtures may also contain conventional additives for rubber, e.g., fillers such as lamp black, silicic acid and talcum, softeners such as naphthene oils or paraffin oils, aging retardants, accelerators, activators, cross-linkers, flameproofers and odor improvers. Incorporation of the tackifier is carried out in conventional rubber processing equipment such as kneaders or roller mills at temperatures above approx. 120°C.

The following Examples the parts are by weight.

EXAMPLE 1

In separate tests, 5 parts of different oxohexahydropyrimidines are kneaded, at 120°C, into a natural rubber mixture having the following composition:
  100 parts of masticated natural rubber,
  50 parts of lamp black,
  5 parts of a naphthene oil as softener.
The following compounds are used:

II 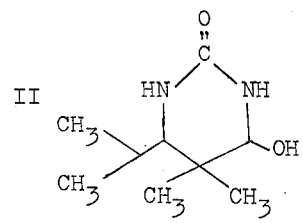

III 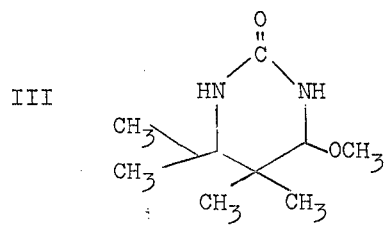

IV 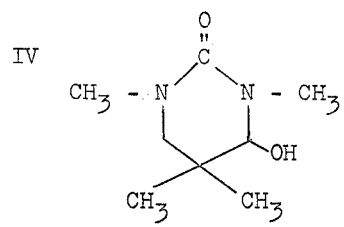

V 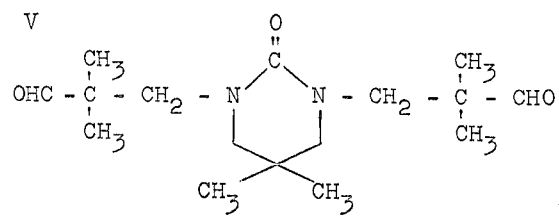

VI 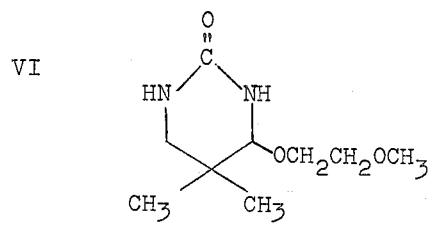

VII 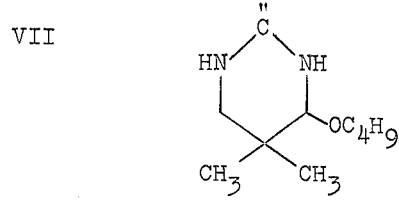

VIII 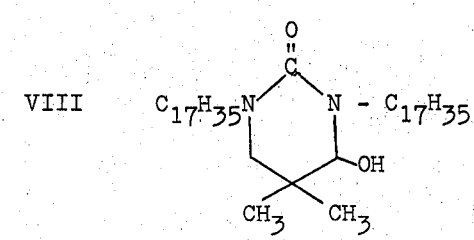

Compared with the untreated mixture and with a mixture containing 5 parts of a commercial tackifier based on a hydrocarbon resin, there is seen to be a very considerable improvement in the surface tack. One measure of the surface tack is given by the force required to pull apart two strips of the rubber mixture being tested. The strips are first pressed together under a specific pressure. To avoid tearing of very tacky strips during the test, they are first laminated to a flexible fabric. The surface tack is given below in kg and is based on an effective width of the strip of 6 mm. The measuring range is from 0 to 2 kg maximum (Bussemater, van Beek, Rubber Chemistry and Technology 37 (1964), No. 1, "A New Type of Tackmeter").

Results:

| Additive | Storage time of strips | | |
|---|---|---|---|
| | 1 day | 2 days | 5 days |
| none | >2 | 0.6 | 0.5 | 0.4 |
| hydrocarbon resin | >2 | 1.2 | 0.8 | 0.5 |
| compounds II to VIII | >2 | >2 | >2 | >2 |

EXAMPLE 2

5 Parts of the compound of formula II are added to an oil-extended butadiene/styrene mixture at 120°C.

The composition of the mixture is as follows:
50 parts of butadiene/styrene rubber
50 parts of oil-extended butadiene/styrene rubber
50 parts of lamp black
20 parts of talcum
10 parts of softener.

Test results:

| Additive | Storage time of strips | | |
|---|---|---|---|
| | 1 day | 2 days | 5 days |
| none | >2 | 0.7 | 0.7 | 0.6 |
| hydrocarbon resin | >2 | 1.0 | 0.8 | 0.7 |
| compound II | >2 | 1.2 | 1.1 | 0.9 |

We claim:
1. Rubber mixtures containing from 1 to 20 parts, based on 100 parts of rubber, of a 2-oxohexahydropyrimidine of the general formula

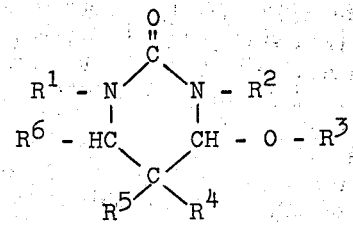

in which the radicals $R^1$ to $R^6$ may be the same or different and each individually denotes hydrogen or alkyl of from 1 to 20 carbon atoms, optionally substituted by further functional groups.

* * * * *